United States Patent [19]

Unno et al.

[11] Patent Number: 4,814,681
[45] Date of Patent: Mar. 21, 1989

[54] ROTARY BODY POSITION CONTROL APPARATUS

[75] Inventors: Mahito Unno; Yuji Yokoi, both of Nagoya, Japan

[73] Assignee: Mitsubishi Denki Kabushiki Kaisha, Tokyo, Japan

[21] Appl. No.: 878,156

[22] Filed: Jun. 25, 1986

[30] Foreign Application Priority Data

Jun. 26, 1985 [JP] Japan .................................. 60-139467

[51] Int. Cl.$^4$ .............................................. G05B 19/18
[52] U.S. Cl. .................................................... 318/569
[58] Field of Search ...................... 318/594, 561, 569

[56] References Cited

U.S. PATENT DOCUMENTS

| | | | |
|---|---|---|---|
| 3,723,843 | 3/1983 | Pearson | 318/594 |
| 4,006,394 | 2/1977 | Coda | 318/594 |
| 4,184,108 | 1/1980 | Sordello | 318/594 |
| 4,258,301 | 3/1981 | Kawa | 318/594 |
| 4,347,470 | 8/1982 | Kohzai | 318/594 |

Primary Examiner—Bentsu Ro
Attorney, Agent, or Firm—Sughrue, Mion, Zinn, Macpeak & Seas

[57] ABSTRACT

A rotary shaft position control apparatus in which the rotary shaft is stopped in one revolution. After detection that a flux emitter on the shaft has passed a position detector, the shaft speed is set to a first speed. The first speed is continued until a product of the first speed and the elapsed time at the first speed after passing the position detector equals a predetermined constant. Then, the speed is reduced to a second speed. Finally, the shaft is stopped when the flux emitter again passes the detector.

8 Claims, 6 Drawing Sheets

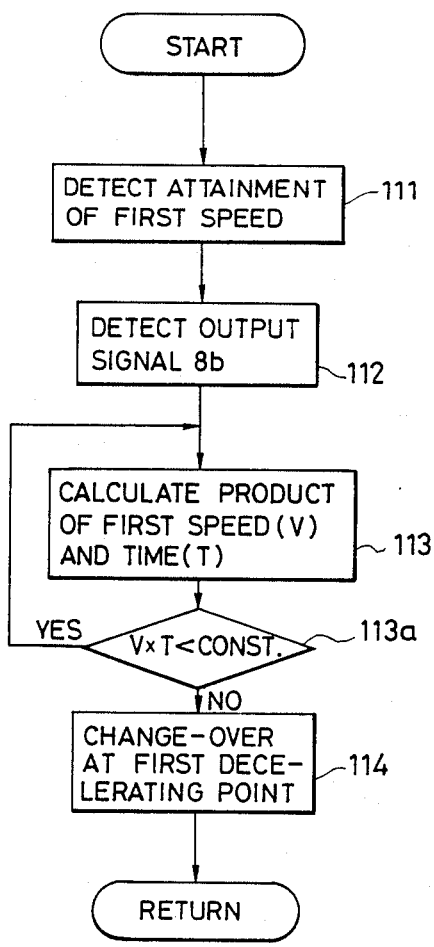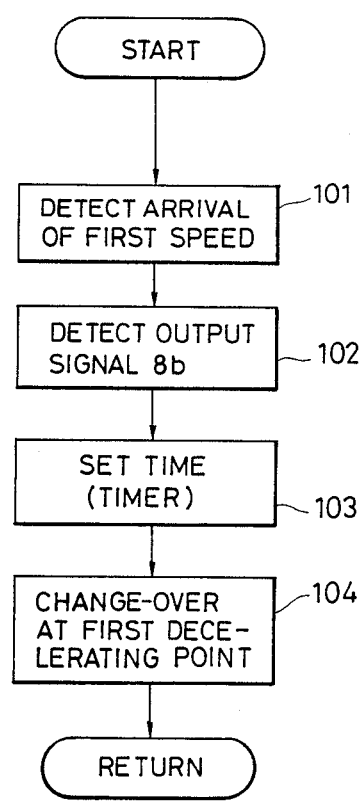

ROTARY BODY POSITION CONTROL APPARATUS

BACKGROUND OF THE INVENTION

1. Field of the Invention

The present invention generally relates to a rotary body position control apparatus. In particular, it relates to an apparatus for properly stopping a main shaft of a machine tool at a predetermined position.

2. Background Art

FIG. 5 is a schematic diagram showing the conventional rotary body position control apparatus. In the drawing, a control apparatus 1 constitutes a feedback control system. The control apparatus 1 controls the rotational speed of a motor 2. To a motor shaft 3 of the motor 2 is connected a toothed wheel 4. Another toothed wheel 5 is geared with the first toothed wheel 4. A rotary shaft 6 connected to the second toothed wheel 5 acts as a main shaft of a machine tool. A magnet 7 is mounted on the rotary shaft 6 at its outer peripheral portion. A position detector 8 is fixed in opposition to the magnet 7 for producing two kind of voltages in accordance with magnetic flux generated by the magnet 7. A pulse encoder 9 produces pulses in accordance with the rotational speed of the motor 2.

FIG. 6 is a block diagram showing in detail the arrangement of this conventional rotary body position control apparatus. In FIG. 6, elements corresponding to those of FIG. 5 are correspondingly referenced, and the remaining elements are arranged as follows. That is, a microcomputer 10 is provided with a ROM, RAM, and a buffer, the functions of the microcomputer 10 except for switches being illustrated by blocks. An A/D converter 11 converts a first output 8a of the position detector 8 into a digital signal of N bits (for example, 8 bits). A voltage detector 12 converts a level of a second output 8b of the position detector to a logical level signal. A position control circuit 13 calculates a speed command for the motor 2 on the basis of output signals from the A/D converter 11 and the voltage detector 12. A speed detection circuit 14 counts the number of output pulses of the pulse encoder 9 so as to produce a speed feedback signal of N bits. A speed control circuit 15 calculates a deviation of the speed feedback signal produced from the speed detection circuit 14 from the speed command produced from the position control circuit 13 so as to apply a speed control signal to the motor 2. A first speed command 16 used for deceleration has a higher instructed speed than a second speed command 17, also used for deceleration. A stop position command 18 instructs a stop position. A speed-attainment detection circuit 19 produces a signal of an "H" level when the first speed command 16 coincides with the speed feedback signal. A gear-ratio reading circuit reads a gear setting value 22. A timer reading circuit 21 reads a timer setting valve 23, SW1 to SW6 are control switches which are used in various places in the position control circuit 13.

Referring to FIGS. 7 and 8, the operation of the thus arranged conventional rotary body position control apparatus will be described hereunder.

Upon reception a speed control signal from the control apparatus 1, the motor 2 rotates so that the rotary shaft 6 is driven at a speed determined by the ratio of the number of teeth, that is, the gear ratio of the first toothed wheel 4 to the second toothed wheel 5. At that time, magnetic flux generated by the magnet 7 mounted on the rotary shaft 6 is detected by the position detector 8, so that a voltage signal is applied to the control apparatus 1 in accordance with a rotational or angular position of the magnet 7. Pulse signals of the number corresponding to the rotational speed of the motor 2 are also applied to the control apparatus from the pulse encoder 9. Then, the control apparatus 1 compares a speed feedback signal obtained by counting the number of pulses of the pulse encoder 9 with a speed command obtained on the basis of the voltage signal from the position detector 8, and applies a speed control signal to the motor 2 so as to zero a difference between the speed command and the speed feedback signal to thereby to cause the rotary shaft 6 to stop at a predetermined position.

The position detector 8 produces a voltage signal $8a$ which becomes zero in voltage as shown in FIG. 7A when the center of the position detector 8 coincides with the center of the magnet 7 and becomes a maximum or a minimum when the center of the position detector 8 coincides with an end of the magnet 7. The position detector 8 also produces another voltage signal $8b$ which becomes fixed at a positive value as shown in FIG. 7B as long as the center of the position detector 8 is opposite to the magnet 7. The voltage signal $8a$ is converted into a digital signal of N bits by the A/D converter 11 and the voltage signal $8b$ is converted into a signal having a "H" level in a positive period of the signal $8b$ by the voltage detector 12. These voltage signals $8a$ and $8b$ are then applied to the position control circuit 13. Therefore, when the motor 2 is rotated at an ordinary rotational speed as shown in FIG. 8A, the position detector 8 produces the voltage signals $8a$ and $8b$ each having a predetermined period as shown in FIGS. 8B and 8C, respectively.

Upon application of a predetermined position stopping command for the rotary shaft 6, the switches $SW_1$ and $SW_2$ in the position control circuit 13 are closed to apply the first speed command 16 instructing a first deceleration speed, which is a speed less than a normal one, to the speed control circuit 15. At the same time the gear-ratio setting value 22 is read by the gear-ratio setting reading circuit 20, so that a first position servo loop control is performed. That is, the motor 2 is decelerated to a first reduced speed. When the motor 2 has reached the first deceleration speed at a timing $t_1$ of FIG. 8, the speed feedback signal from the speed detection circuit 14 coincides with the first speed command 16 and the speed-attainment detection circuit 19 detects this coincidence so as to close the switch $SW_5$ at the timing of the respective leading edges of the signals.

The output signal $8b$ from the voltage detector 12 is applied to the position control circuit 13 through the thus closed switch $SW_5$, so that the timer reading circuit 21 reads the timer setting value 23 at a timing of the transition of the output signal $8b$ of the voltage detector 12 towards a level "L", that is, at a timing $t_2$ when the magnet 7 passes by the position detector 8. During the running of the timer, the motor continues turning at the first speed.

The switches $SW_1$ and $SW_2$ are opened and the switches $SW_3$ and $SW_4$ are closed at a timing $t_3$ after the setting time has elapsed. As a result, the second speed command 17 instructing a second deceleration speed smaller than the first speed instructed by the first speed command 16 is applied to the speed control circuit 15. At the same time, the gear-ratio setting value 22 is read by the gear-ratio reading circuit 20, so that the first position servo loop control is replaced by a second one. Thus, the motor 2 is decelerated to reach the second deceleration speed. After the second deceleration speed has been reached, the switch $SW_6$ is closed at a timing $t_4$ when the voltage signal 8a becomes a maximum and the voltage signal 8b rises in the positive direction, that is, the center of the magnet 7 reaches the end of position detector 8. As a result, the position control circuit 13 produces a speed command for stopping the motor 2 on the basis of the difference between the stop position command 18 (assumed here to be zero volts) and the output signal of the position detector 8, so that the speed control circuit 15 controls the speed of the motor 2 to stop the rotary shaft 6 at a position where the output signal 8a of the position detector 8 becomes just zero (volts).

As described above, in the conventional rotary body position control apparatus, the timer setting value is read at the timing $t_2$ when the voltage signal 8b falls negatively after the motor 2 has reached the first deceleration speed, and the motor 2 is changed over into the second deceleration speed after the timer setting value has elapsed.

Therefore, if the timer setting value is too small, the motor 2 is prematurely changed over into the second deceleration speed, so that the duration in which the motor 2 is being rotated at the second deceleration speed is prolonged and the time taken for positioning the rotary shaft is lengthened.

If the timer setting value is set too large, on the other hand, there is a possibility that the motor 2 has not yet been changed over from the first deceleration speed to the second one even if the stopping point has been reached, so that the rotary shaft may overshoot the target stopping position to make it impossible to perform a smooth positioning operation of the rotary shaft.

The foregoing disadvantage is due to not only to the timer setting value but a change in first deceleration speed, and therefore there has been such a problem that the timer setting value is required to be changed every time the first deceleration speed is changed.

SUMMARY OF THE INVENTION

An object of the present invention is therefore to solve the foregoing problems in the prior art.

In particular, an object of the present invention is to provide a rotary body position control apparatus in which it is possible to stop a rotary body smoothly in a short time and it is unnecessary to change the timer setting value.

In the rotary body position control apparatus according to the present invention, in order to determine a timing when a motor for driving a rotary body is changed from a first deceleration speed into a second one, there is provided an operation circuit for producing a speed change-over signal when the product of the first deceleration speed and the time elapsed from the arrival of a magnet on the rotary body at a predetermined point becomes a predetermined value.

According to the present invention, if the first deceleration speed is large or small, the speed change-over signal is produced respectively earlier or later, on the basis of the timing when the magnet mounted on a rotary body reaches a predetermined position, so that the rotary body can be stopped immediately after the first deceleration speed has been changed into the second speed.

The present invention will be apparent from the following detailed description taken in conjunction with the accompanying drawings.

BRIEF DESCRIPTION OF THE DRAWINGS

FIG. 4 is a flowcharts for explaining the operation of the embodiment;

FIG. 9 is a flowchart for explaining the operations of the main elements of the apparatus.

DETAILED DESCRIPTION OF THE PREFERRED EMBODIMENTS

Figure 1:
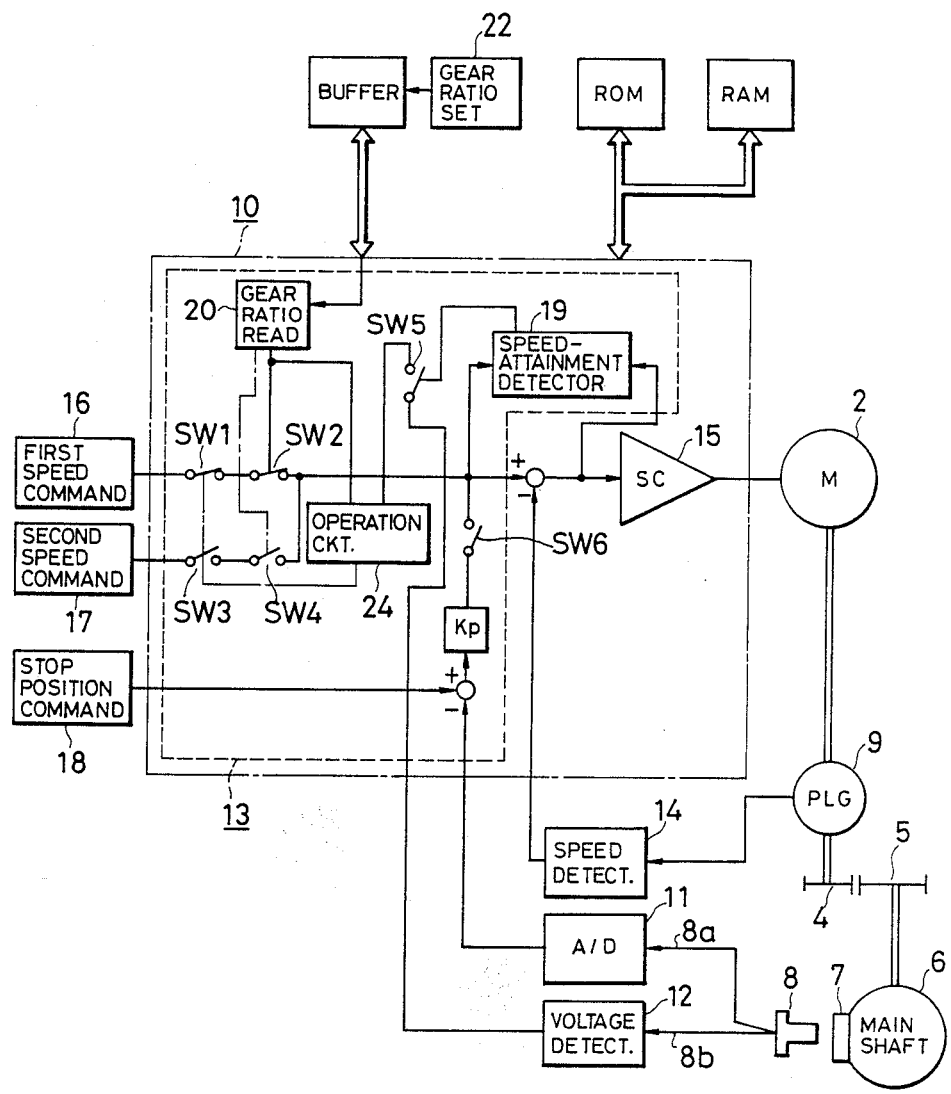
FIG. 1 is a block diagram showing the arrangement of an embodiment according to the present invention.
Figure 6:
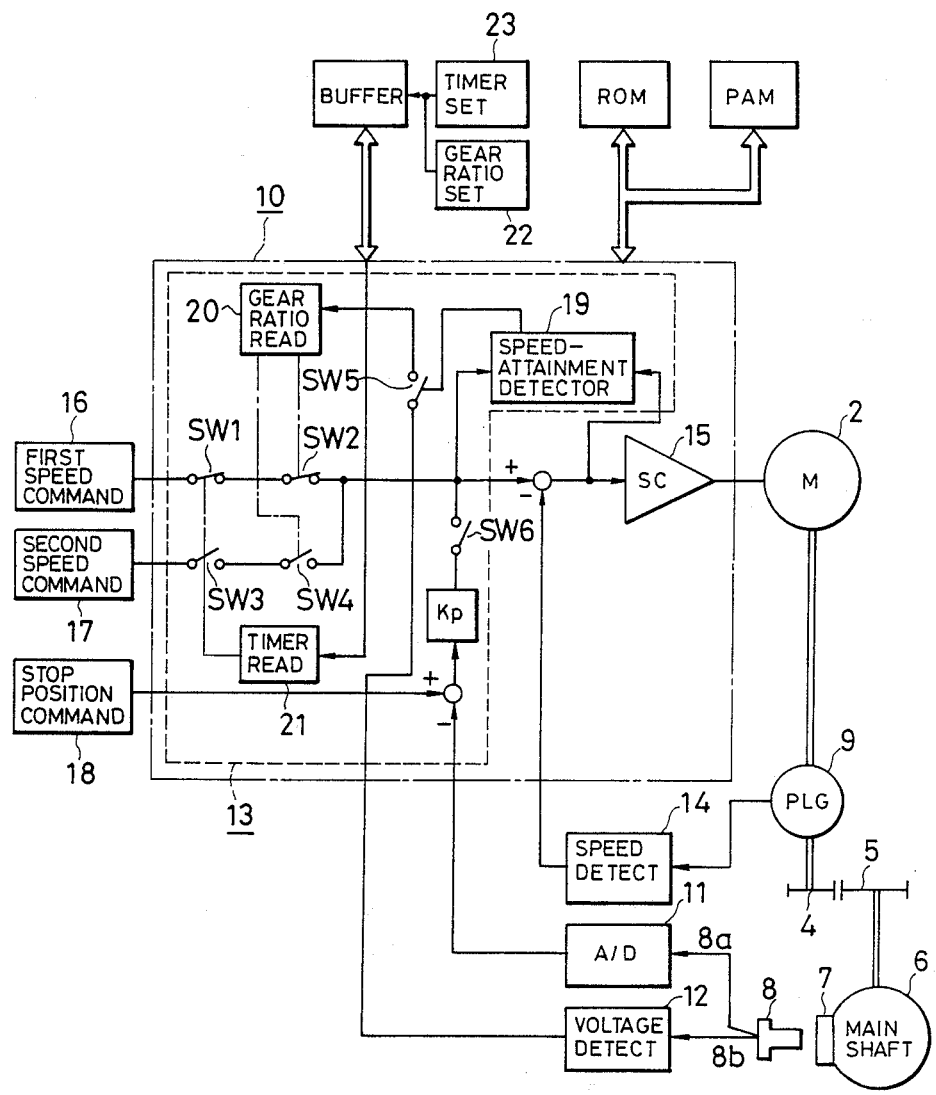
FIG. 6 is a block diagram showing a detailed arrangement of the apparatus.
Figure 7A:
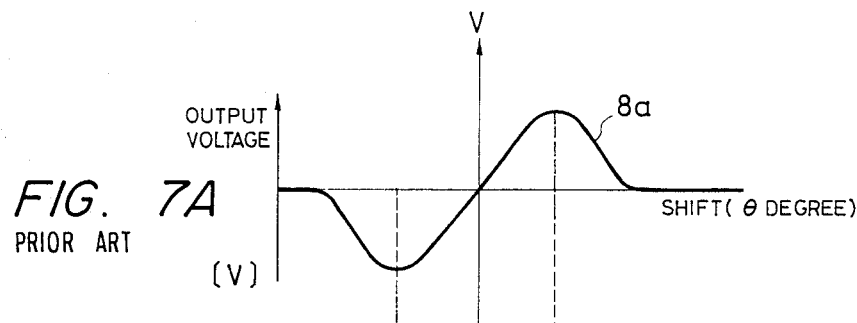
FIGS. 7A–7B show graphs of the output characteristics of the main element of the apparatus.
Figure 7B:
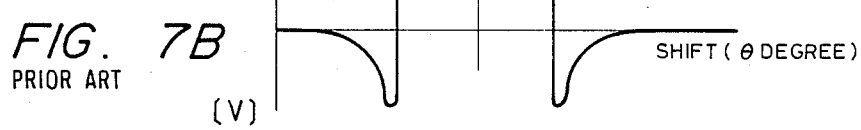
Figure 8A:
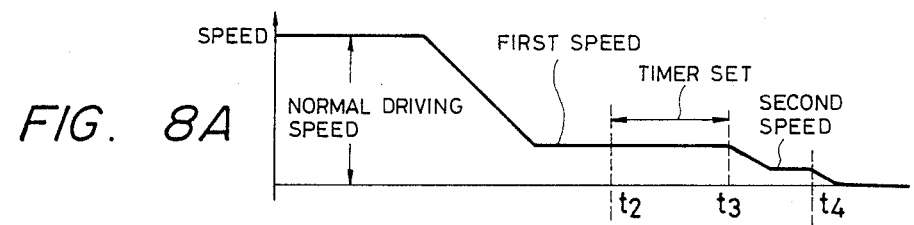
FIGS. 8A–8D show timecharts for explaining the operation of the apparatus.
Figure 8B:
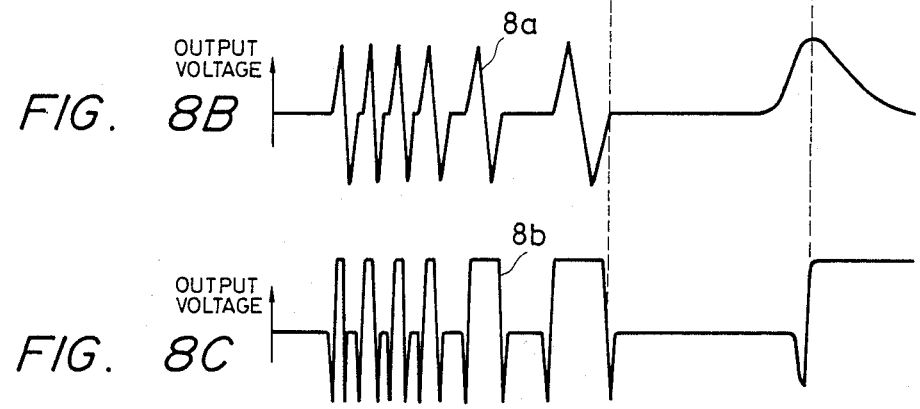
Figure 8C:
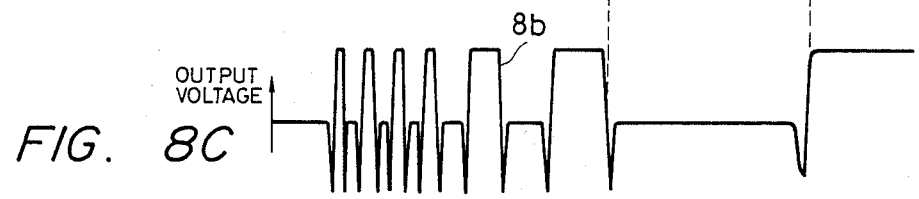
Figure 8D:
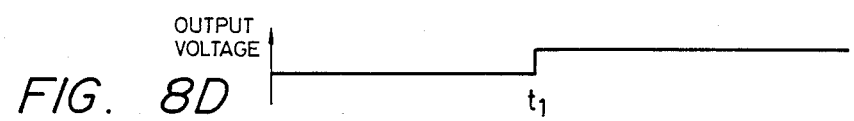

FIG. 1 is a block diagram showing an embodiment of the rotary body position control apparatus according to the present invention. In the drawing, elements corresponding to those of FIG. 6 are correspondingly referenced, and explanation thereof is omitted. The rotary body position control apparatus according to the present invention is different from the conventional one in that, in place of the timer reading circuit 21 and the timer setting value 23 of the conventional apparatus of FIG. 6, there is provided an operation circuit 24 which calculates the product of a first deceleration speed obtained on the basis of the gear ratio and the time elapsing during the first deceleration speed so as to change-over the switches $SW_1$ and $SW_3$ on the basis of the result of calculation.

Referring FIG. 1 together with FIGS. 2 and 3, description will be made hereunder as to the operation of this embodiment, particularly, as to the points in which the invention differs from the conventional apparatus.

When a motor 2 has reached a first deceleration speed, the speed-attainment detection circuit 19 produces a signal of an "H" level so as to close the switch $SW_5$. Upon the closure of the switch $SW_5$, a signal from a voltage detector 12 is input into an operation circuit 24 through the switch $SW_5$. The product of the first deceleration speed (taking the gear ratio into consideration) and the time for the continuation of the first deceleration speed is calculated during a period beginning when the level of the output signal 8b of the voltage detector 12 is lowered due to the passage of a magnet 7 by a setting point of the position detector 8. The gear ratio must be taken into consideration because the speed of the first gear 4 is being measured while the speed of the second gear 5 is the speed of the main shaft 6. After the lapse of this first deceleration speed period, switches $SW_1$ and $SW_2$ are opened and the switches $SW_3$ and $SW_4$ are closed at the time corresponding to the first deceleration speed.

Figure 2:
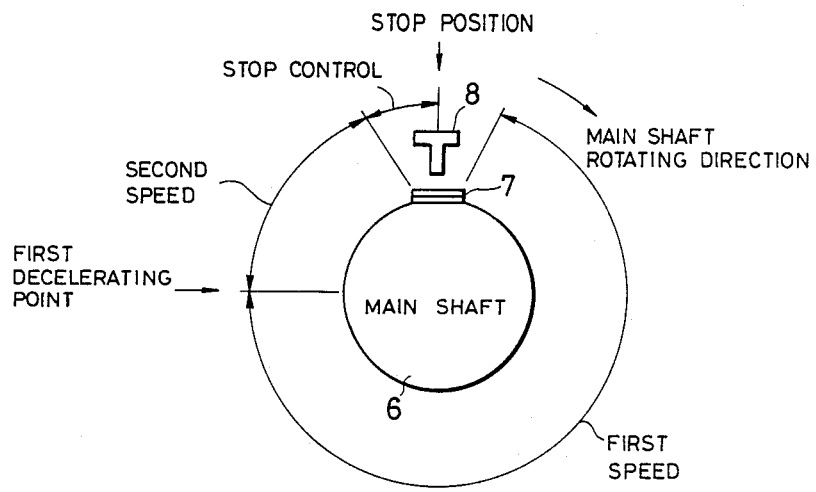
FIG. 2 is a diagram for explaining the operation of the embodiment.

FIG. 2 illustrates the foregoing operation. Assume that the main shaft 6 on which the main shaft is mounted is rotated clockwise in the drawing relative to the fixed position detector 8. Assume also that the main shaft is being rotated at the first deceleration speed. When the magnet 7 passes by the setting point of the position detector 8, the product of the first deceleration speed and the elapsed time is calculated. The first decelerating speed used in this calculation can be a non-measured value since this speed depends only upon the preset first speed command 16 and the gear ratio reading 20. A speed change-over signal is produced at a first decelerating point when this product has reached a predetermined value. It is a matter of course that the time to the first decelerating point becomes short or long when the first deceleration speed is determined to be respectively large or small. The speed is begun to be reduced to a second deceleration speed at the first decelerating point so that the magnet 7 nears the setting point of the position detector 8 immediately after the second deceleration speed has been reached.

Figure 3A:
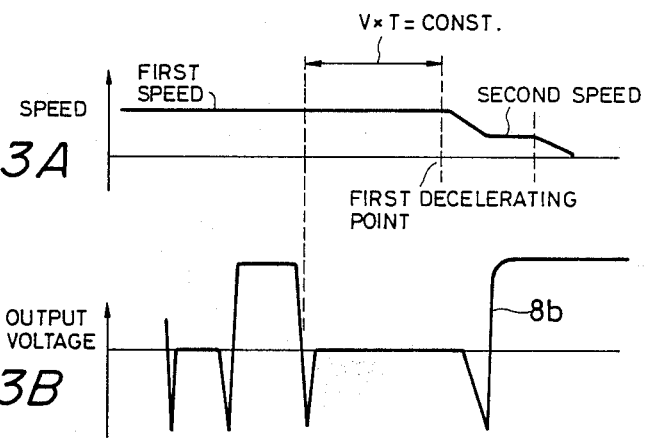
FIGS. 3A and 3B show timecharts for explaining the operation of the embodiment.
Figure 3B:
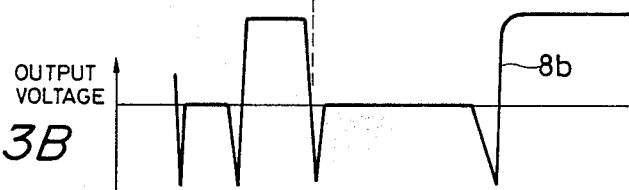
Figure 5:
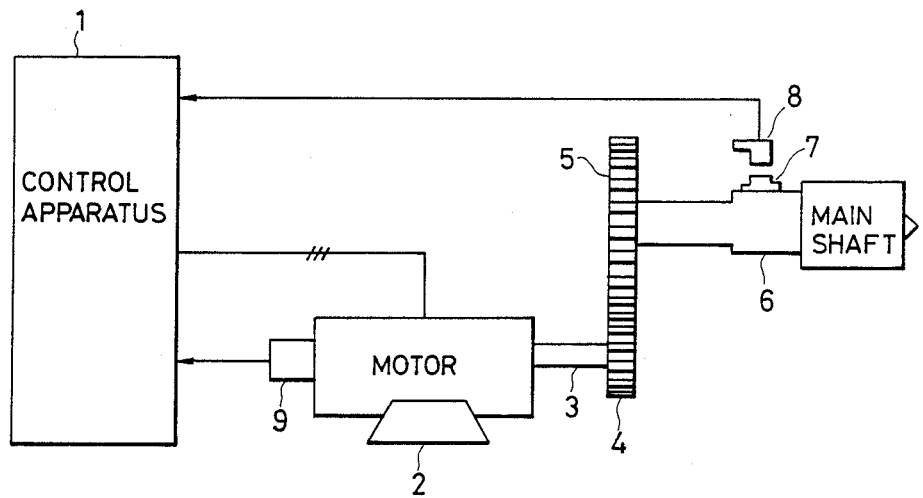
FIG. 5 is a schematic diagram showing the conventional rotary body position control apparatus.

FIGS. 3A and 3B are timecharts in which the FIG. 3A shows the relationship between the output 8b of the voltage detector 12. FIG. 4 is a flowchart for executing processing software for obtaining the first decelerating point. In FIG. 4, upon the detection of the attainment of the speed at the first deceleration value in step 111, the downward transition of the output signal 8b is detected in step 112. The product between the first deceleration speed and the time since the downward transition of signal 8b is calculated in step 113. Then the speed change-over signal is produced at the first decelerating point in step 114 when the product of the elapsed time and the speed equals or exceeds a predetermined constant, as determined in step 113a. The procedure is repeated.

Although the description has been made as to the case where a main shaft of a machine tool is caused to stop in a predetermined position, in the foregoing embodiment, it is needless to say that the rotary body position control apparatus according to the present invention can be applied to general stopping position control for any other rotary body driven by a motor.

As apparent form the foregoing explanation, the rotary body position control apparatus according to the present invention is provided with the operation circuit for producing a speed change-over signal when the product of the first speed and the time elapsed after the magnet mounted on the rotary body has reached a predetermined point becomes a predetermined value. Accordingly, it is possible to cause the rotary body to stop at a predetermined position smoothly in a short time and it is made unnecessary to change the timer setting value.

What is claimed is:

1. A rotary body position control apparatus, comprising:
    a rotary body (6) driven to rotate by a driving source (2);
    flux generation means (7) mounted on said rotary body;
    a detector (8) fixedly provided for detecting magnetic flux generated by said flux generation means;
    control means (10) for producing a speed change-over signal for changing-over, prior to final stopping of said rotary body, a rotational speed of said driving source from a first speed to a second speed smaller than said first speed on the basis of a detection output signal from said detector after said flux generation means reaches a predetermined point so as to stop said rotary body at a predetermined position with respect to said detector, said control means being provided with operation means (24) for producing said speed change-over signal at a timing when a product of said first speed and the time elapsed from arrival of said flux generation means (7) at said predetermined point becomes a predetermined value; and
    a speed detection circuit (14) for detecting said rotational speed of said driving source (2) and for transferring a detection signal representing a result of detection to said control means (10) as a feedback signal; and
wherein said control means (10) includes:
a first circuit for receiving a first speed command;
a second circuit for receiving a second speed command;
a speed control circuit (15) for producing a speed control signal to said driving source (2); and
a speed-attainment detection circuit (19) for receiving the detection signal from said speed detection circuit (14), said speed-attainment detection circuit actuating said operation means (24) when said speed-attainment detection circuit detects that said rotary body (2) has reached said first speed, said operation means (24) producing the speed change-over signal so that connection of said speed control circuit (15) is changed from said first circuit to said second circuit.

2. A rotary body position control apparatus according to claim 1, further comprising a first and a second toothed wheel provided between said driving source (2) and said rotary body (6) for transmitting rotational driving force, and a gear-ratio reading circuit (20) provided in said control means (10) for reading a gear ratio of said first toothed wheel to said second toothed wheel.

3. A rotary body position control apparatus according to claim 1, wherein said control means causes said driving source to stop driving said rotary body at said second speed in response to a signal from said detector.

4. A rotary body position control apparatus according to claim 1, in which said speed-attainment detection circuit (19) compares an output signal of said detector (8) with the detection signal of said speed detection circuit (14) and actuates said operation means (24) when said output signal of said detector coincides with said detection signal.

5. A rotary body position control apparatus according to claim 1, in which said detector (8) periodically produces a first and a second output signal in accordance with the rotational speed of said rotary body (6).

6. A rotary body position control apparatus according to claim 1, in which said detector (8) periodically produces a first and a second output signal in accordance with the rotational speed of said rotary body (6), said first output signal being applied to said speed-attainment detection circuit (19), said second output signal being applied to said operation means (24) by said speed-attainment detection circuit (19).

7. A rotary body position control apparatus according to claim 1, in which said detector (8) periodically produces a first and a second output signal in accordance with the rotational speed of said rotary body (6), said first output signal being a voltage signal which becomes zero when a center of said detector (8) coincides with a center of said flux generation means (7) and which assumes maximum levels opposite in polarity to each other when said center of said detector (8) corresponds respectively to opposite ends of said flux generation means.

8. A rotary body position control apparatus according to claim 1, in which said detector (8) periodically produces a first and a second output signal in accordance with the rotational speed of said rotary body (6), said second output signal being a voltage signal which is generated with a predetermined polarity and at a predetermined level only in a period in which a center of said detector (8) is opposite to said flux generation means (7).

* * * * *